(12) United States Patent
Larroche

(10) Patent No.: US 7,914,870 B2
(45) Date of Patent: Mar. 29, 2011

(54) LIMITED LIFE MEDIUM

(75) Inventor: Patrick Larroche, New York, NY (US)

(73) Assignee: FDD Technologies sa/ag, Ltd., Zug (CH)

( * ) Notice: Subject to any disclaimer, the term of this patent is extended or adjusted under 35 U.S.C. 154(b) by 648 days.

(21) Appl. No.: 11/983,960

(22) Filed: Nov. 13, 2007

(65) Prior Publication Data

US 2008/0118696 A1 May 22, 2008

Related U.S. Application Data

(60) Provisional application No. 60/860,553, filed on Nov. 22, 2006.

(51) Int. Cl.
*B32B 3/02* (2006.01)

(52) U.S. Cl. .................. 428/64.1; 428/64.4; 430/270.11

(58) Field of Classification Search .................. None
See application file for complete search history.

(56) References Cited

U.S. PATENT DOCUMENTS

| 6,011,772 A | * | 1/2000 | Rollhaus et al. | 369/286 |
| 6,468,619 B1 | | 10/2002 | Larroche | 428/64.1 |
| 2005/0195728 A1 | | 9/2005 | Larroche | 369/275.1 |

OTHER PUBLICATIONS

*ECMA* Standard ECMA-267, 3$^{rd}$ Edition, Apr. 2001-pp. 1-86.

* cited by examiner

*Primary Examiner* — Elizabeth Mulvaney
(74) *Attorney, Agent, or Firm* — Drinker Biddle & Reath LLP

(57) ABSTRACT

A limited-life storage medium comprises a flowable agent. In one example, the storage medium is an optical disc. In a ready-to-read condition, the center of mass of the disc does not coincide with the center of rotation. When the disc is read, the unbalanced rotation of the disc causes vibration that migrates the flowable agent into contact with a metal data-carrying layer, where the flowable agent interferes with the readability of the data so as to limit the useful life of the disc. The movement of the flowable agent improves the balance of the disc, and reduces the vibration.

21 Claims, 2 Drawing Sheets

LIMITED LIFE MEDIUM

CROSS-REFERENCE TO RELATED APPLICATIONS

This application claims the benefit of my U.S. Provisional Patent Application No. 60/860,553, titled Limited Life Medium, filed Nov. 22, 2006, which is incorporated herein by reference in its entirety.

The present application is related to my co-pending U.S. Patent Application No. 60/860,615, titled Limited Installation Medium, filed Nov. 22, 2006, and U.S. Patent Application No. 60/860,567, titled Limited Life Medium, filed Nov. 21, 2006, which are incorporated herein by reference in their entirety, and to commonly invented and assigned U.S. Patent Application Publication No. 2005/0195728, which is incorporated herein by reference in its entirety.

FIELD OF THE INVENTION

The invention relates to media used to distribute information, and especially to such a medium that is intended to become unusable within a short period after the medium is first used or activated.

BACKGROUND

It is well known to distribute information, for example, music or motion pictures, on a disc or other portable medium. The medium may be either rented or sold to a member of the public who wishes to listen to or view the content of the medium. Sale prices are higher than rental fees, because a purchaser who retains permanent possession of a copy of the content gains greater benefit than a renter who has the medium with the content for only a short time. In order to prevent users from improperly exploiting the price difference, rental stores take steps to ensure that copies of the medium are returned at the end of the rental period. However, these returns are expensive for the store and inconvenient for the customer.

In order to eliminate the administrative cost and inconvenience of rental returns, it has previously been proposed to provide a storage medium that becomes unusable within a short period after the medium is removed from its packaging or after the medium is first read. For rental of motion pictures, a period of a few hours to a few days is typically appropriate.

Examples of previously-proposed limited life media are described in commonly invented U.S. Pat. No. 6,468,619, and U.S. Patent Application Publication No. 2005/0195728, and in U.S. Pat. No. 6,100,772.

With all of these devices, either reading the storage medium or some step preliminary to such reading, such as removing the storage medium from a container, initiates a process that renders the storage medium unusable. In many of these previously proposed devices, the agent that limits the life of the medium is a liquid, such as a solution of a mild acid or other corrosive agent in water, and the process of rendering the medium unusable is initiated by moving the solution from a storage location within the medium to an active location at which the liquid is in contact with a part of the storage medium that actually carries data.

U.S. Patent Application Publication No. 2005/0195728 proposes an optical disc that self-destructs within a predetermined period after the disc is first read. The disc described in U.S. Patent Application Publication No. 2005/0195728 contains a reservoir of solvent near its center. The process of reading the disc involves rotating the disc at high speed. Centrifugal force from the rotation redistributes the solvent to a location where the solvent destroys part of the data storage layer. The disc of U.S. Patent Application Publication No. 2005/0195728 is well suited to discs of the CD or DVD type, in which the data storage layer is a thin metal foil, susceptible to destruction by mild acids, and in which the inner edge of the data storage layer carries a vital control track. By suitable selection of the strength of the acid, the time within which the disc becomes unusable can be selected in a range from minutes to days.

In the interests of economy and reliability, a simple design of the mechanism for moving the solution to the active location is desirable. The mechanism of U.S. Patent Application Publication No. 2005/0195728 is especially simple. That mechanism has no moving parts, and is operated solely by the liquid flowing under the action of centrifugal force when the disc rotates. However, where a liquid flowing under centrifugal force is used, the fluid properties of the liquid, such as viscosity and surface tension, are significant. It is well within the ordinary skill in the art to formulate suitable liquid agents by adjusting the composition of the liquid and the dimensions of the chambers and passages within which the liquid is contained. However, the correct balance of properties to ensure that the liquid flows sufficiently easily for the limited operating life to be initiated reliably when the disc is first read, without flowing so easily that the operating life is initiated prematurely by jolts or jerks in transport, may require precise formulation.

There is therefore a continuing need for an improved optical disc or other storage medium that more reliably initiates its limited-life function when, and not until, the disc is first played.

SUMMARY

One embodiment of the present invention provides a limited-life data storage medium that in normal use is subject to rotation when read. The medium comprises a data storage region for storing readable data, and a reservoir containing a flowable agent so arranged that the agent can flow from the reservoir to permanently interfere with the readability of the data. In normal use, forces associated with the rotation of the disc tend to cause flowing of the agent from the reservoir. In a ready-to-play condition with the agent in an initial position in the reservoir, the center of gravity of the disc does not coincide with the normal center of rotation of the disc, and vibration caused by the unbalanced rotation of the disc tends to cause or assist flowing of the flowable agent when the disc is played.

One embodiment of the present invention provides a limited-life disc comprising a flowable agent such as a liquid that is arranged to be redistributed by forces arising when the disc is played, and that when redistributed is arranged to limit the useful life of the disc, for example by corroding a data storage layer over a predetermined time. In a ready-to-play condition the center of gravity of the disc does not coincide with the center of rotation of the disc, but redistribution of the liquid agent when the disc is played reduces the separation between the center of gravity and the center of rotation.

The separation of the center of gravity from the center of rotation in the ready-to-play condition is preferably sufficient to cause a perceptible vibration of the disc when the disc is played in an ordinary CD or DVD player. The separation may result in sufficient vibration that the disc in the ready-to-play condition cannot be read by an ordinary CD or DVD player until redistribution of the flowable agent reduces the vibration. The vibration may have an amplitude of 0.1 mm or more when the disc is rotating at CD audio speed (approximately 16 revolutions per second) in an ordinary CD or DVD player.

The flowable agent may be a liquid, in which case the liquid may be too viscous to be redistributed by centrifugal force from the rotation of the disc without the assistance of the vibration. The flowable agent may be a thixotropic material or a solid of low shear strength that would not flow, or would not flow to a material extent, under the action of centrifugal force from the ordinary rotation of the disc without vibration.

The flow of the flowable agent may be caused substantially entirely by the vibration, or by a combination of vibration and centrifugal force.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, examples of which are illustrated in the accompanying drawings.

Figure 1:
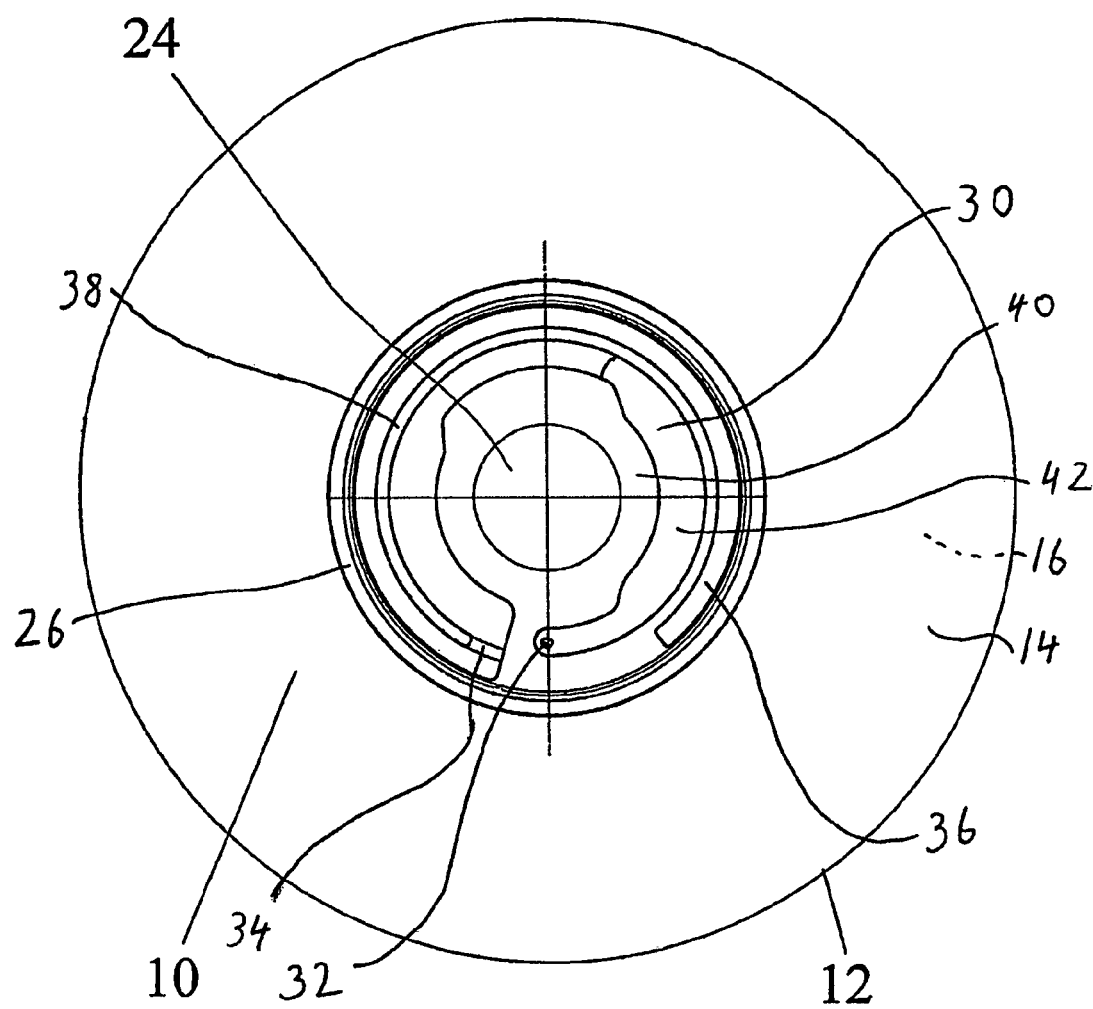
FIG. 1 is a schematic drawing of an optical disc.

Referring initially to FIG. 1, one embodiment of a data storage disc, indicated generally by the reference numeral 10, is in the form of an optical disc, which except as described below may be generally similar to the disc 10 shown in U.S. Patent Application Publication No. 2005/0195728, and in the interests of conciseness parts of that description summarizing the conventional structure of a CD or DVD are not here repeated in full. The disc 10 is circular, and has an outer periphery 12.

The optical storage medium 10 is a laminate that consists essentially of, in order, a first rigid substrate 14, a first layer of reflective material 16, a layer of adhesive, and a second rigid substrate (not shown) which except as discussed below may be substantially the same as the first rigid substrate 14. A second layer of reflective material (not shown) which except as discussed below may be substantially the same as the first layer of reflective material 16, and/or a decorative layer or a layer bearing human-readable indicia, may also be present between the layer of adhesive and the second rigid substrate. The substrates include a central aperture or opening 24 and are made of transparent material, such as plastic, for example, transparent polycarbonate plastic. Polycarbonate is presently preferred, because it is commonly used for commercially-available CDs and DVDs, and the processes for forming polycarbonate into the substrate 14 are widely available and well understood.

In the embodiment, the first reflective layer 16 is a metal coating formed on the first rigid substrate, and the second reflective layer, if present, is a metal coating formed on the second rigid substrate. The two halves thus formed are then joined together with a layer of hot-melt glue or other adhesive. In pressed CDs and DVDs, the metal coating forming the reflective layers is commonly aluminum, but may instead by silver, or other metals. In recordable CDs and DVDs, the metal coating is usually silver.

The optical storage medium 10 includes readable data or information represented by pits, bumps, dots, or other markings formed in the first reflective layer 16 and having a reflectivity different from the reflectivity of other markings or of unmarked parts of the first reflective layer. The markings are scanned by a laser through the first rigid substrate to read the data. In the embodiment, the markings are preferably pits or dots pressed or molded into the surface of the first substrate before the first substrate is coated with the first reflective layer. Various methods for forming the first rigid substrate and the first reflective layer are known and, in the interests of conciseness, will not be further described here.

The second rigid substrate, with the second reflective layer applied to it as a coating, may be similarly formed. The second reflective layer may be a further data storage layer, read either through the first rigid substrate and the first reflective layer, if the first reflective layer is partly reflective and partly transparent, or through the second rigid layer. Alternatively, the second reflective layer may be merely a dummy layer. If the second reflective layer is not used for data storage, it may be omitted. In accordance with the industry standard for DVDs and CDs, the data stored on the first reflective layer starts with a lead-in section 26 at the radially inner edge of the first reflective layer, nearest to the central aperture 24. This configuration is especially suitable for a DVD-9 format disc, in which the first reflective layer is read from the center outward, and the second reflective layer is then read from the circumference inward.

A first reservoir 30 is formed in the second rigid substrate, or alternatively in the first rigid substrate. The first reservoir is in the form of an annular groove in the inner face of the second rigid substrate, extending round a majority of arc of the disc 10, for example, for approximately 350° of arc. The shape of the first reservoir is described in more detail below with reference to FIG. 2. The first reservoir or groove 30 is separated from the central aperture 24 of the disc 10 by a land 40. Near one end, the groove 30 is connected with the exterior by a hole 32 passing through the thickness of the second rigid substrate. Near the other end, the groove 30 is connected by a radial passageway 34 to a second reservoir or groove 36. The second reservoir 36 is annular, and is concentric with the disc 10 and is radially outside the first reservoir 30. A wall 38 separates the first reservoir 30 from the second reservoir 36, and is penetrated only by the radial passageway 34.

The second reflective layer has its inner edge at the outer edge of the second reservoir 36. However, the lead-in section 26 of the first reflective layer overlaps, and forms at least part of one wall of, the second reservoir 36. The first reflective layer does not overlap the first reservoir or groove 30. Preferably, the inner edge of the first reflective layer is outside the wall 38. Because the position of the lead-in section 26 is effectively determined by the industry standard for CDs, DVDs, and similar media, this effectively determines the radial position of the second reservoir 36. If the second reflective layer is the second data layer of a DVD-9 disc, the DVD-9 standard tolerates having the inner, lead-out edge of the second data layer a few millimeters further out than usual.

The adhesive is applied by coating the second rigid substrate, and the second reflective layer already laminated onto the second rigid substrate, but not applying any adhesive into or over the recesses forming the reservoirs 30 and 36 and the passageway 34. This ensures that the lead-in section 26 is exposed to the outer reservoir 36, while the inner reservoir 30 is entirely enclosed by polycarbonate and adhesive.

Figure 2:
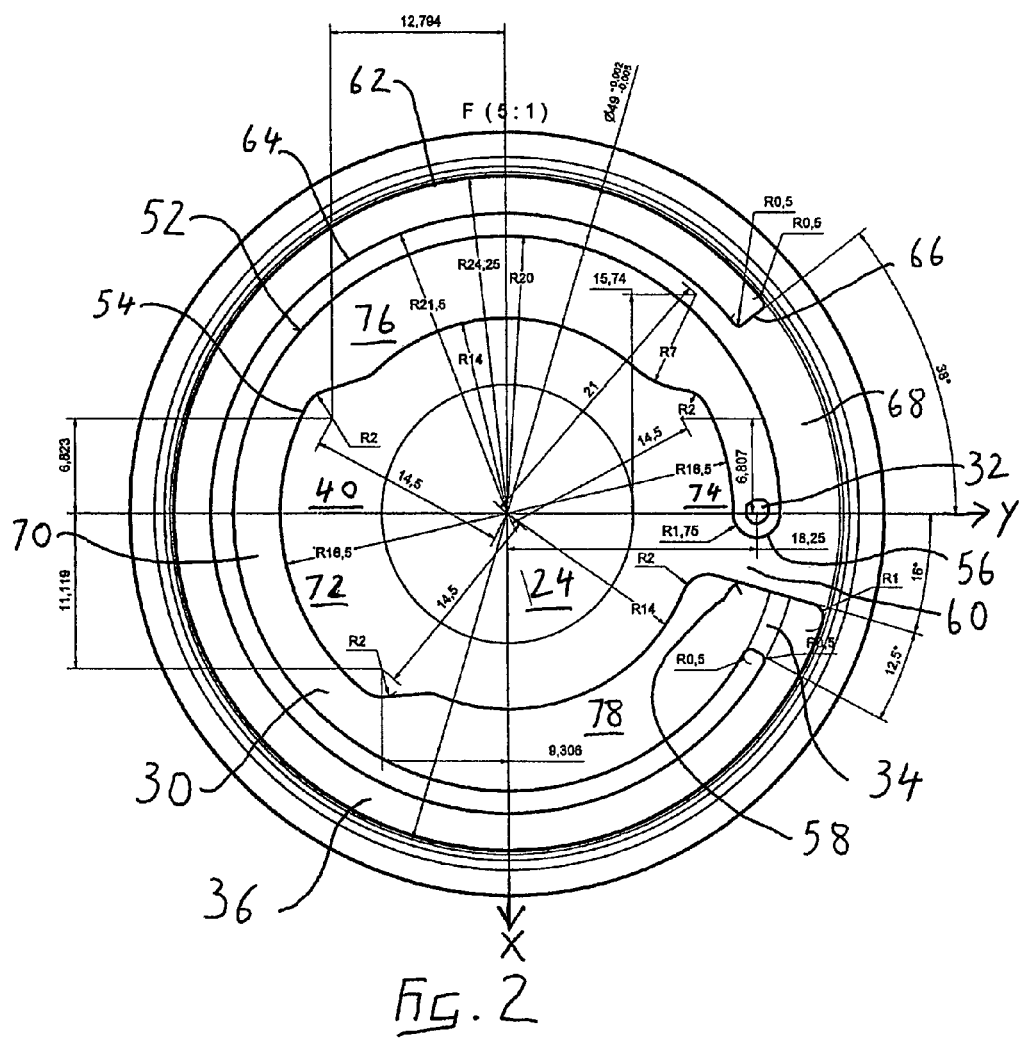
FIG. 2 is an enlarged view of a central part of the disc shown in FIG. 1.

Referring now also to FIG. 2, in one example the disc 10 is a standard DVD that is approximately 54 mm in radius to the periphery 12, with a central hole 24 that is 9.5 mm in radius. The first reservoir 30 has an outer edge 52 with a radius of 20 mm, and an inner edge 54 with a radius that is partly 14 mm and partly 16.5 mm. Starting from the filling hole 32, the inner edge 54 of the first reservoir 30 has the radius of 16.5 mm for about 35° of arc around the center of the disc 10, the radius of 14 mm for about 110° of arc around the center of the disc 10, the radius of 16.5 mm for about 90° of arc around the center of the disc 10, and the radius of 14 mm for about 110° of arc around the center of the disc 10. There remains a space of about 15° of arc around the center of the disc 10 between a first end 56 of the inner reservoir 30, which is a semicircle centered on the filling hole 32, and the opposite end 58. this 15° space is occupied by a land 60 that joins the central land 40 to the wall 38. The outer reservoir 36 is bounded by an outer edge 62 of radius 24.25 mm, and an inner edge 64 of radius 21.5 mm, and extends through approximately 305° of arc from the wall 58 to an opposite end 66. The two ends 58 and 66 of the outer reservoir 36 are separated by a land 68 that lies outside the part of the inner reservoir 30 with the filling hole 32 and is continuous with the land 60. The passageway 34 separates the wall 38 from the reservoir end 58.

As may be seen in FIG. 2, the resulting configuration is almost symmetrical about a line extending through the center of the disc 10, approximately through the middle of the land 68 on one side and through the middle of the portion 70 of the first reservoir 30 with inner radius 16.5 mm opposite. In a direction along the mentioned line, the disc 10 is less symmetrical. The widened portion 72 of the land 40 alongside the narrow portion 70 of the first reservoir 30 is larger than the widened portion 72 of the land 40 alongside the filling hole 32, but not as large as the combined area of the land portions 60, 68, and 74.

However, if the disc 10 is made largely of polycarbonate with a density of 1.2 kg/dm$^3$, the outer reservoir 36 is filled with a flowable agent having a density of, for example, 1.03 kg/dm$^3$, and the inner reservoir 30 contains only vapor with a density of the order of 0.001 kg/dm$^3$, it has been calculated that the disc 10 can be balanced sufficiently precisely that the center of gravity of the whole disc is within 10 or 20 nanometers of the geometrical center of the hole 24, which will be the center of rotation of the disc 10 in a disc player. The exact dimensions for centering the mass of the disc to a desired precision may be determined by conventional methods using commercially-available computer aided design software, and in the interests of conciseness are not further described here. Perfect balancing of the disc 10 may be considered ideal, but in practice it is usually sufficient for the disc 10 to be balanced within the normal tolerances for conventional discs of the same format.

On the other hand, if the same flowable agent is entirely confined to the widened part 76 of the inner reservoir 30 between the filling hole and the narrow part 70, an imbalance results laterally of the previously mentioned radial line. It has been calculated that under this condition the center of gravity may be approximately 9 μm from the center of rotation. Even for a music CD playing at 1000 rpm, that is sufficient to cause a perceptible vibration of the disc 10. The vibration may have an amplitude of 0.1 mm or more, and may be sufficient to prevent reading of the disc by an ordinary CD player. For a computer disc, which may run 8 or 12 times as fast, the vibration may be considerably stronger for a given imbalance of the disc, or the same vibration may be achieved with a smaller imbalance. Where the initial vibration is sufficient to prevent reading of the disc by an ordinary CD player, that has the consequence that if for any reason the flowable agent 42 fails to migrate promptly when playing is started, the disc 10 becomes an unusable disc, rather than a disc with longer than intended (and possibly indefinite) life. That consequence may be desirable in some applications and undesirable in other applications.

By way of contrast, in discs manufactured as described in my co-pending U.S. Patent Application Publication No. 2005/0195728, the center of gravity is typically around 6 μm from the center of rotation, and that distance does not change appreciably when the liquid agent moves from the first to the second reservoir.

Once the disc 10 has been assembled, a liquid or other flowable chemical agent 42 is introduced into the first reservoir 30 through the hole 32. After the agent 42 is introduced, the hole 32 is then sealed with a drop of adhesive.

In normal storage and handling of the disc 10, where the agent 42 is a runny liquid, the liquid 42 is retained in the part of the first reservoir 30 nearest the hole 32 by surface tension. Where the agent 42 is a soft solid, the agent 42 is retained by the stiffness of the solid. Where the agent 42 is a viscous liquid or a thixotropic material, both stiffness and surface tension may assist. It is preferred to fill the wider portion 76 of the first reservoir 30 next to the filler hole 32 to a point just beyond the transition to the narrower portion 70. It is preferred to use a volume of flowable agent 42 substantially equal to the volume of the outer reservoir 36. This allows a reasonable amount of agent 42, while leaving a substantial length of dry groove 30, so that even if the flowable agent 42 is liquid and sudden movements of the disc 10 cause some migration thereof, the liquid 42 is very unlikely to reach the passageway 34. A greater or smaller amount of the flowable agent 42 may be used, provided that the amount is coordinated with the shape of the reservoirs 30 and 36 to ensure the desired imbalance before migration of the agent 42 and the desired balance after migration of the agent.

However, when the optical storage medium 10 is used, the disc is rotated very rapidly, typically at least 1000 rpm, to allow it to be read by a fixed laser. This rapid rotation of the unbalanced disc 10 generates a considerable vibration. This vibration causes the flowable agent 42 to spread along the groove 30 until the agent reaches the passageway 34. The agent 42 then spreads along the second reservoir 36, where it comes into contact with the lead-in section 26 of the data on the first reflective layer 16. The centrifugal force caused by the rotation of the disc 10 may assist the distribution of the agent, by providing an extra bias to the dispersion, encouraging the agent to move to, and spread along, the outer edge of the first reservoir 30, to move outwards from the first reservoir 30 to the second reservoir 36 through the passageway 34, and to spread along the outer edge of the second reservoir 36, where the agent contacts the lead-in section 26. Alternatively, or in addition, tangential forces resulting from angular acceleration of the disc 10 as it is read in combination with the inertia of the flowable agent 42, and/or impulses arising from sudden changes in angular acceleration, may assist the movement of the flowable agent.

It is presently preferred to select the properties of the agent 42 and the amount of vibration such that the agent 42 will migrate from the wider portion 76 of the first reservoir 30 to the second reservoir 30 under the effect of vibration alone. However, an agent that migrates only under the combined effect of vibration and centrifugal or other forces arising from the rotation of the disc 10, together with any capillary attraction, may also be used.

As the agent 42 advances round the first reservoir 30, the center of gravity of the disc 10, and thus the amount of vibration, will vary. Initially, the agent 42, and the center of gravity, will shift towards the side of the disc with the reservoir portion 70. As the agent 42 spreads further, the imbalance will gradually reduce. However, the migration of the agent 42 can be assisted by making the part 78 of the first reservoir 30 nearer to the passage 34, or at least the outer edge of that part, deeper than the parts 70, 76 in which the liquid was initially confined. The radially inner area of the part 78 of the first reservoir 30 does not contain flowable agent 42 in normal operation, even when the agent is migrating from the reservoir part 76 to the passage 34, and may be shaped primarily to balance the disc.

The agent 42 in the first reservoir 30 is a preselected chemical agent that will render the lead-in section 26 of the optical storage medium 10 unreadable after a preselected period of time, by dissolving or otherwise reacting with the aluminum or other metal first reflective layer and altering its reflectivity so that the laser cannot read the data. In the preferred embodiment, the agent 42 dissolves away the metal layer over a period of a few minutes to a few days, depending on the intended use. It is not necessary to obliterate the data on the first reflective layer entirely. Merely damaging the lead-in section 26 renders the disc 10 unusable in any standard DVD or CD player, because the player relies on information in the lead-in section to identify and locate the data files stored on the main part of the disc.

Aluminum, which is a material widely used for the reflective layers of CD and DVD discs, has relatively low reactivity in that, due to its characteristics, it is protected by a cover of oxide at any time. Despite this low reactivity, aluminum is known to react to certain chemicals under certain conditions and circumstances when the aluminum oxide is dissolved by a chemical agent that can, because of the dissolution of the oxide, react with the aluminum. For example, aluminum is sensitive to bases such as NaOH or KOH, acids such as HCl, $H_2SO_4$, $HNO_3$, and citric acid, and several metallic salts, such as $CuSO_4$, NaCl, silver nitrate, and gold chloride, as a few examples.

The properties of these chemical agents may be advantageously used to facilitate and control the rate of dissolution or corrosion of the aluminum. For example, the corrosion of an aluminum reflective layer 16 may be steady and uniform with certain agents, such as NaOH or HCl, or the layer may become pitted upon exposure to agents such as $CuSO_4$.

In particular, a solution of NaOH with a concentration of 0.06 g/l and a pH of 11 generates a rate of dissolution of the aluminum reflective layer 16 ranging anywhere between approximately 0.3 micron per hour and approximately 1.0 micron per hour. In a typical DVD, the thickness of the aluminum reflective layers is typically 40 or 50 nanometers. With the above-mentioned NaOH solution, therefore, an operating life of from 2½ to 10 minutes will result. If a longer operating life is desired, inhibitors like soda silicate can reduce or delay the action of NaOH, thereby reducing the rate of dissolution of the aluminum of the reflective layer 16, and extending the period over which the data will become unreadable. Alternatively, the operating life could be adjusted by changing the thickness of the aluminum layer and/or the concentration of the NaOH solution.

A solution of HCl with a concentration of 5.0% produces a rate of dissolution of the aluminum of the reflective layer 16 ranging anywhere between approximately 1.0 microns per 24 hours and approximately 3.0 microns per 24 hours, giving an operating life of around 20 minutes to 1 hour without special thickening of the aluminum layer. Inhibitors can reduce or delay the effects of the HCl even further, thereby reducing the rate of dissolution, and extending the period over which the data will be readable.

As yet another example, a solution of $CuSO_4$ with a concentration of 1.0% produces a rate of dissolution of the aluminum of the reflective layer 16 ranging anywhere between approximately 1.0 microns per 24 hours and approximately 2.0 microns per 24 hours.

With the above-mentioned reagent solutions, therefore, a reasonable operating life for a DVD of from several hours to a few days will require either that the lead-in portion 26 of the first reflective layer 16 be specially thickened over the typical 40 or 50 nanometers, or that a weaker solution of the reagent be used.

Alternatively, a mixture of one part saturated citric acid in water, two parts saturated NaCl in water, and twenty parts aqueous carrier medium disables a typical aluminum reflective layer in a DVD in between 8 and 24 hours at room temperature.

Care should be taken that the liquid chemical agent 42 does not dissolve the polycarbonate or other material of the substrates 14 and 22, and does not dissolve the adhesive 18. Even if the disc 10 is kept for a long period after it ceases to be usable, the agent 42 is unlikely to dissolve out along the layers of reflective material 16 and 20 and escape at the edge of the disc, because of the narrowness of the gap that would be formed by such dissolution. The agent 42 should, however, not be such a strong corrosive agent that it would create a hazard to persons or property if the liquid were released by breaking the disc 10.

Another factor is the type of metallic material used for the reflective layer 16. Although aluminum is presently widely used, other types of metallic material may be used with the optical storage medium 10. Therefore, the type of metallic material used for the reflective layer 16 should be taken into account to determine the type, concentration, and amount of the chemical agent 42 needed. The same reagents mentioned above may be used in approximately the same concentrations with silver as the reflective layer.

Other examples of suitable agents 42 include: a concentrated aqueous solution of NaCl and $CuSO_4$, giving an operating life of approximately 10 minutes in a disc 10 where the reflective layer is aluminum; a solution of 1% NaCl and 1% $CuSO_4$ in a medium of 80% propylene glycol and 20% water, giving an operating life of approximately 5 minutes in a disc 10 where the reflective layer is aluminum on copper; a solution of 1% NaCl and 1% $CuSO_4$ in a medium of 80% propylene glycol and 20% water, giving an operating life of approximately 5 minutes in a disc 10 where the reflective layer is silver; and a solution of from 1% to 15% KCl in a medium of 80% propylene glycol and 20% water, giving an operating life of approximately 5 minutes in a disc 10 where the reflective layer is silver. The KCl composition in glycol and water used with a silver disc is presently preferred. The glycol and water mixture is further described in co-pending U.S. Patent Application No. 60/860,567 filed Nov. 21, 2006.

Because the liquid chemical agent 42 is retained in the first reservoir 30 solely by capillary action, the surface tension of the liquid and the readiness with which that liquid wets the material forming the first reservoir and the second reservoir 36 are important. It has been found that with a water-based liquid 42 that does not contain any additives materially altering the surface tension or wetting properties, and polycarbonate substrates 14 and 22, a first reservoir with portions 76 and 70 from 0.03 mm to 0.4 mm deep in the axial direction is suitable. A depth of 0.25 mm is presently preferred. In the portion 78, the depth may increase to 0.35 mm. Because of the large difference between the width and the depth, only the depth is important for liquid flow. If the reservoir 30 is too shallow, then the liquid 42 will not reliably disperse under the action of the vibration from the unbalanced disc at the normal operating speed of a CD or DVD, even when assisted by centrifugal force. If the reservoir 30 is too deep, then the agent 42 may flow out too easily before the disc 10 is used, especially if the agent is a low-viscosity liquid. For the second reservoir 36, a depth of 0.2 mm is presently preferred. In the interests of stability, it is preferred that the second reservoir 36 contain all of the agent 42, and the agent 42 fill the second reservoir 36, once the migration of the agent is completed, so the width and depth of the second reservoir are related to each other and to the volume of agent provided.

Other agents may require different dimensions for the reservoirs 30 and 36. For example, a liquid that wets the substrates more readily than water may require a shallower reservoir. If an ink is added to make the liquid 42 visible, and thus make it easier to see if the liquid has been expelled into the second reservoir, it should be borne in mind that many inks contain a surface active agent that may affect the behavior of the liquid. Testing the capillary behavior of a specific liquid in a specific medium, such as polycarbonate, and adjusting the designed depth of the reservoirs 30 and 36 is routine.

If the depths of the reservoirs are adjusted for a liquid with different surface tension, wetting power (contact angle) on polycarbonate, or other fluid properties, then the balance must of course be recalculated. However, as noted above, the radially inner parts of the reservoir section 78 are not important to the liquid flow, and can be reshaped to adjust the balance in both the X and Y directions marked in FIG. 2.

The flowable agent 42 may be an agent other than a free-flowing liquid. For example, my copending U.S. Patent Application No. 60/860,567 filed Nov. 21, 2006, proposes a storage medium 10 in which the flowable agent 42 is a mixture of water and glycol. For example, ethylene glycol, with a viscosity at 298 K of 16 mPa·s, or 1, 2 propylene glycol, with a viscosity at 298 K of 40 mPa·s, (compared with 1.000 mPa·s for water) may be used. By selection of a suitable glycol, an agent 42 that has the properties of a soft wax with low shear strength can be produced. Examples include polyethylene glycols such as those in the range of PEG 600 to PEG 1500, which are hygroscopic solids with low melting points (around 17-22° C. for PEG 600 and around 42-48° C. for PEG 1500).

Experiments with an electromagnetic vibrator on a non-rotating sample disc suggest that such a medium can disperse satisfactorily from the first reservoir part 76 to the second reservoir 36, and can distribute itself so as to reduce the vibration to within the tolerance of an ordinary CD or DVD reader, even with no assistance at all from centrifugal force. In the experiments, either a sample DVD 10 or a turntable simulating the motion of a disc drive with a sample DVD 10 mounted on the turntable was fixed to a commercially available vibratory conveyor, enabling the effects of both vibration alone and vibration combined with rotation to be determined. Both the speed of rotation and the speed and amplitude of the vibration were variable. In addition, a sample DVD 10 mounted on a turntable was used without the vibratory conveyor but with a small weight attached asymmetrically to the DVD 10 in various positions to simulate the effect of various levels of unbalance. By these experiments, it was possible to separate the effects of rotation and the effects of vibration, and to assess the amount of vibration caused by various amounts of unbalance. The test results confirmed that for a practical embodiment of a DVD in accordance with the embodiment shown in FIGS. 1 and 2 the desired movement of the agent 42 can be achieved by vibration resulting from unbalance, even without assistance from the centrifugal force or other rotational effects.

Other media that may be used for the flowable agent 42 include aqueous media rendered thixotropic by a suitable additive, for example, the fumed silica material available under the Registered Trademark CAB-O-SIL from Cabot Corporation of Billerica, Mass.

It is desirable for the agent 42 to spread freely along the second reservoir 36. Because the second reservoir 36 is bounded partly by the reflective metal or other material of the lead-in section 26, the behavior of the agent 42 may be different in the first and second reservoirs. The water-based and glycol-based liquids mentioned above are particularly suitable in the present embodiments, because they wet aluminum or silver more readily than they wet polycarbonate, so they flow more freely in the second reservoir 36 than in the first reservoir 30.

Various modifications and variations can be made in the present invention without departing from the spirit or scope of the invention.

The embodiments of the invention described above with reference to the drawings relate primarily to the distribution of motion pictures and other entertainment media for use by members of the public over a limited period of time, typically from a few hours to a few days. However, the invention has applicability for other situations where a storage medium that remains readable for only a limited period after activation is desired. For example, if the disc 10 is used to distribute computer programs or other information that is to be installed from the disc 10 onto a computer or the like, a life of from a few minutes to a few tens of minutes after the disc is first activated may be sufficient to allow installation on one computer, while frustrating attempts to install on multiple computers.

Although the destruction of the lead-in section of a CD-ROM or DVD disc provides a simple and effective embodiment of the invention, other parts of the information on a storage medium could be destroyed, depending in part on the arrangement of the specific storage medium. For example, any part of the information on the medium could be destroyed, provided the destruction of that information is effective to render the medium unusable to the ordinary user. The information need not actually be destroyed, but could alternatively be obscured or obliterated so that the information cannot be reliably read by generally available playback devices. Alternatively, the medium could be constructed so that only part of the information on the disc becomes unusable.

Although the present specification refers to the disc 10 or other storage medium becoming unusable after a predetermined time, it is not usually necessary for the operating life of the medium to be very precisely predetermined. For consumer protection purposes, it is desirable to be able to specify a minimum operating life, defined so that a disc 10 becoming unusable in less than the minimum operating life would be regarded as defective. For the benefit of the owner of the copyright in the motion picture or other information stored on the disc 10, who wishes to be sure that the purchaser receives only the benefit that the purchaser has paid for, it is desirable to be able to specify a maximum operating life, defined so that a disc 10 remaining usable for more than the maximum operating life would be regarded as defective. However, in many commercial models the maximum operating life may acceptably be several times the minimum operating life. The disc may then have a typical or nominal operating life that is somewhere between the minimum and the maximum, and any of those measures of the operating life of the disc may be regarded as a "predetermined" life.

Although the described embodiment involves a disc 10 in which the information content is molded onto the substrate layers, a writable disc 10 on which information is "burned" after the disc is assembled is possible. A writable disc either would have a comparatively long operating life that starts when the disc is burned, or would be charged with the liquid chemical agent 42 after burning is completed.

Although specific physical forms for the flowable agent 42 have been described, any agent 42 may be used that has the desired properties. In order to minimize the hindrance to reading of the disc caused by the vibration, it is preferred that the agent 42 migrate rapidly when reading starts, and that the destruction of data or other interference with reading take effect over a longer period of time. The limited life of the disc is then determined primarily by the time taken for the destruction of data or other inhibition of reading to take effect after migration.

The novel features disclosed in the present application may be combined with the features disclosed in my co-pending U.S. Patent Application No. 60/860,615 filed Nov. 22, 2006, and U.S. Patent Application No. 60/860,567 filed Nov. 21, 2006.

Thus, it is intended that the present invention cover the modifications and variations of this invention provided they come within the scope of the appended claims and their equivalents.

What is claimed is:

1. A limited-life data storage medium that in normal use is subject to rotation when read, the medium comprising:
   a data storage region for storing readable data;
   a reservoir containing a flowable agent so arranged that the agent can flow from the reservoir to permanently interfere with the readability of the data;
   wherein in normal use forces associated with the rotation of the disc tend to cause or assist flowing of the agent from the reservoir;
   wherein in a ready-to-play condition with the agent in an initial position in the reservoir the center of gravity of the disc does not coincide with the normal center of rotation of the disc, and vibration caused by the unbalanced rotation of the disc tends to cause or assist flowing of the flowable agent when the disc is played; and
   wherein the separation between the center of gravity and the center of rotation is greater when the flowable agent is in the initial position than when the flowable agent is in a position to interfere with the readability of the data.

2. A medium according to claim 1, further comprising a second reservoir, within which in normal use the flowable agent is contained in a position to interfere with the readability of the data.

3. A medium according to claim 1, wherein flowing of the flowable agent reduces the separation between the center of gravity and the center of rotation by a factor of at least 10.

4. A medium according to claim 1, wherein flowing of the flowable agent reduces the separation between the center of gravity and the center of rotation by a factor of at least 100.

5. A medium according to claim 1, wherein when the flowable agent is in the initial position the separation between the center of gravity and the center of rotation is at least 10 μm.

6. A medium according to claim 5, wherein when the flowable agent is in the initial position the separation between the center of gravity and the center of rotation is at least 50 μm.

7. A medium according to claim 1, which is a disc, and wherein when the flowable agent is in the initial position the separation between the center of gravity and the center of rotation is at least 0.01% of the radius of the disc.

8. A disc according to claim 7, wherein when the flowable agent is in the initial position the separation between the center of gravity and the center of rotation is at least 0.05% of the radius of the disc.

9. A disc according to claim 1, wherein the flowable agent is an aqueous liquid comprising a water-soluble reagent.

10. A limited life storage medium according to claim 9, wherein the data is stored on a layer of metal and the at least one water-soluble reagent is selected from NaOH, KOH, HCl, $H_2SO_4$, $HNO_3$, citric acid, $CuSO_4$, NaCl, $AgNO_3$, $AuCl_3$, and combinations thereof.

11. A limited-life disc comprising a flowable agent that is arranged to be redistributed by centrifugal force when the disc is played, and that when redistributed is arranged to limit the useful life of the disc, wherein in a ready-to-play condition the center of gravity of the disc does not coincide with the center of rotation of the disc, and wherein redistribution of the liquid agent when the disc is played reduces the separation between the center of gravity and the center of rotation.

12. A disc according to claim 11, wherein the separation of the center of gravity from the center of rotation in the ready-to-play condition is sufficient to cause a perceptible vibration of the disc when the disc is played in an ordinary CD or DVD player.

13. A disc according to claim 12, wherein the separation of the center of gravity from the center of rotation in the ready-to-play condition is sufficient to cause a vibration of the disc with an amplitude of at least 0.1 mm when the disc is played at 1000 rpm in an ordinary CD or DVD player.

14. A disc according to claim 11, wherein the separation between the center of gravity and the center of rotation is greater when the flowable agent is in the initial position than when the flowable agent has been redistributed.

15. A disc according to claim 14, wherein flowing of the flowable agent reduces the separation between the center of gravity and the center of rotation by a factor of at least 10.

16. A disc according to claim 15, wherein flowing of the flowable agent reduces the separation between the center of gravity and the center of rotation by a factor of at least 100.

17. A disc according to claim 11, wherein when the flowable agent is in the initial position the separation between the center of gravity and the center of rotation is at least 10 μm.

18. A disc according to claim 17, wherein when the flowable agent is in the initial position the separation between the center of gravity and the center of rotation is at least 50 μm.

19. A disc according to claim 11, wherein when the flowable agent is in the initial position the separation between the center of gravity and the center of rotation is at least 0.01% of the radius of the disc.

20. A disc according to claim 19, wherein when the flowable agent is in the initial position the separation between the center of gravity and the center of rotation is at least 0.05% of the radius of the disc.

21. A disc according to claim 11, wherein the flowable agent is a liquid.

* * * * *